United States Patent
Long et al.

(10) Patent No.: US 11,573,457 B2
(45) Date of Patent: Feb. 7, 2023

(54) ARRAY SUBSTRATE AND DISPLAY DEVICE

(71) Applicant: BOE TECHNOLOGY GROUP CO., LTD., Beijing (CN)

(72) Inventors: Chunping Long, Beijing (CN); Hui Li, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 393 days.

(21) Appl. No.: 16/803,029

(22) Filed: Feb. 27, 2020

(65) Prior Publication Data
US 2021/0003871 A1 Jan. 7, 2021

(30) Foreign Application Priority Data
Jul. 1, 2019 (CN) .......................... 201921008228.X

(51) Int. Cl.
*G02F 1/1339* (2006.01)

(52) U.S. Cl.
CPC ........ *G02F 1/1339* (2013.01); *G02F 1/13398* (2021.01)

(58) Field of Classification Search
None
See application file for complete search history.

(56) References Cited

U.S. PATENT DOCUMENTS

| | | | | |
|---|---|---|---|---|
| 2007/0247582 A1* | 10/2007 | Mochizuki | ............ | G02F 1/1345 349/149 |
| 2008/0284963 A1* | 11/2008 | Kamiya | ................ | G02F 1/1339 349/139 |
| 2012/0257132 A1* | 10/2012 | Kitajima | ........... | G02F 1/136286 349/187 |
| 2015/0102293 A1* | 4/2015 | Cho | ........................ | H01L 33/56 257/40 |

* cited by examiner

*Primary Examiner* — Phu Vu
(74) *Attorney, Agent, or Firm* — Brooks Kushman P.C.

(57) ABSTRACT

The present disclosure relates to an array substrate comprising a substrate body provided, on a perimeter edge thereof, with a sealant coating region to be coated with a sealant, and the sealant coating region comprises a first region provided with a metal trace structure, and further comprises a region provided with a metal structure, a difference between an area of the metal structure and that of the metal trace structure being smaller than a threshold.

20 Claims, 5 Drawing Sheets

ARRAY SUBSTRATE AND DISPLAY DEVICE

CROSS-REFERENCE TO RELATED APPLICATION

This application claims priority to Chinese Patent Application No. 201921008228.X filed on Jul. 1, 2019, which is incorporated herein by reference in its entirety.

TECHNICAL FIELD

The present disclosure relates to the field of display product manufacturing technology, and in particular to an array substrate and a display device.

BACKGROUND

At present, in order to increase bonding stability of a sealant, a metal trace structure will be provided on an array substrate in a sealant coating region to be coated with a sealant. However, the sealant coating region is not entirely coated with the metal trace structure, which causes the arrangement of the sealant to be uneven. Moreover, in general, the sealant is cured by UV light, and a metal can reflect the UV light. Therefore, the provision of the metal trace structure that can reflect the UV light in a part of the sealant coating legion makes UV light irradiation powers inconsistent, thereby causing poor curing of the sealant or other problems.

SUMMARY

In a first aspect, embodiments of the present disclosure provide an array substrate, including: a substrate body; and a sealant coating region, which is on a perimeter edge of the substrate body, in which a sealant is coated, and which includes a first region provided with a metal trace structure, wherein the sealant coating region further includes a region provided with a metal structure, and a difference between an area of the metal structure and that of the metal trace structure is smaller than a threshold.

According to some optional embodiments of the present disclosure, the metal structure has a plurality of metal bumps disposed at intervals.

According to some optional embodiments of the present disclosure, the metal bump is in the form of a square having a side of 2 to 10 micrometers, and the interval between two adjacent squares ranges from 2 to 10 micrometers.

According to some optional embodiments of the present disclosure, the metal bump is in the form of a circle having a diameter of 2 to 10 micrometers, and the interval between two adjacent circles ranges from 2 to 10 micrometers.

According to some optional embodiments of the present disclosure, the metal trace structure includes a plurality of metal traces arranged at intervals, and an arrangement of the metal structure is substantially the same as that of the metal trace structure.

According to some optional embodiments of the present disclosure, an area of the metal structure is substantially the same as that of the metal trace structure.

According to some optional embodiments of the present disclosure, the substrate body is further provided with a display region enclosed within the sealant coating region, the metal structure is located in a second region of the sealant coating region, and the first region is located on a first side of the display region and the second region is on a second side of the display region, which is arranged adjacent to or opposite to the first side.

According to some optional embodiments of the present disclosure, the metal structure is disposal in a same layer as the metal trace structure.

According to some optional embodiments of the present disclosure, a gate metal layer and a source-and-drain metal layer are on the substrate body, and the metal structure is disposed in a same layer as the gate metal layer, or the metal structure is disposed in a same layer as the source-and-drain metal layer.

According to some optional embodiments of the present disclosure, the metal structure is not connected to any external signals.

In a second aspect, embodiments of the present disclosure further provide a display device including an array substrate. The array substrate includes: a substrate body; and a sealant coating region, which is on a perimeter edge of the substrate body, in which a sealant is coated, and which includes a first region provided with a metal trace structure, wherein the sealant coating region further includes a region provided with a metal structure, and a difference between an area of the metal structure and that of the metal trace structure is smaller than a threshold.

According to some optional embodiments of the present disclosure, the metal structure has a plurality of metal bumps disposed at intervals.

According to some optional embodiments of the present disclosure, the metal bump is in the form of a square having a side of 2 to 10 micrometers, and the interval between two adjacent squares ranges from 2 to 10 micrometers.

According to some optional embodiments of the present disclosure, the metal bump is in the form of a circle having a diameter of 2 to 10 micrometers, and the interval between two adjacent circles ranges from 2 to 10 micrometers.

According to some optional embodiments of the present disclosure, the metal trace structure includes a plurality of metal traces arranged at intervals, and an arrangement of the metal structure is substantially the same as that of the metal trace structure.

According to some optional embodiments of the present disclosure, an area of the metal structure is substantially the same as that of the metal trace structure.

According to some optional embodiments of the present disclosure, the substrate body is further provided with a display region enclosed within the sealant coating region, the metal structure is located in a second region of the sealant coating region, and the first region is located on a first side of the display region and the second region is on a second side of the display region, which is arranged adjacent to or opposite to the first side.

According to some optional embodiments of the present disclosure, the metal structure is disposed in a same layer as the metal trace structure.

According to some optional embodiments of the present disclosure, a gate metal layer and a source-and-drain metal layer are on the substrate body, and the metal structure is disposed in a same layer as the gate metal layer, or the metal structure is disposed in a same layer as the source-and-drain metal layer.

According to some optional embodiments of the present disclosure, the metal structure is not connected to any external signals.

BRIEF DESCRIPTION OF THE DRAWINGS

In order to illustrate the technical solutions of the embodiments of the present disclosure more apparently, the accompanying drawings required in the description of the embodiments of the present disclosure will be briefly introduced below. It is evident that the drawings used in the following description relate to only some embodiments of the present disclosure, and based on these drawings, the other drawings can be obtained by those of ordinary skill in the art without exercising any inventive work.

FIG. 1 is a third schematic diagram showing a part of a structure of an array substrate according to a further embodiment of the present disclosure;

DETAILED DESCRIPTION

In order to make the objects, technical solutions, and advantages of the embodiments of the present disclosure more apparent, the technical solutions of the embodiments of the present disclosure will be clearly and completely described hereinafter with reference to the accompanying drawings for the embodiments of the present disclosure. Obviously, the described embodiments are a part, rather than all, of the embodiments of the present disclosure. Based on the described embodiments of the present disclosure, all the other embodiments obtained by those of ordinary skill in the art fall within the protection scope of the present disclosure.

Figure 1:
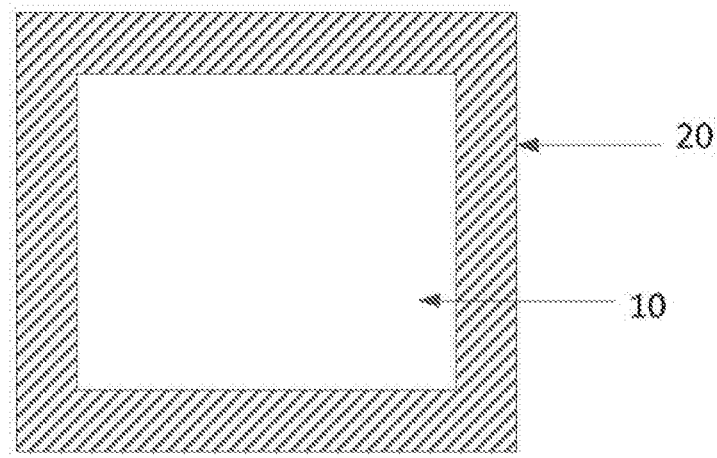
FIG. 1 is a schematic diagram showing a distribution of regions of an array substrate according to some embodiments of the present disclosure.

As shown in FIG. 1, an array substrate generally includes a central display region 10 and a sealant coating region 20 located around the central display region 10. In order to increase the bonding stability of a sealant, a part of the sealant coating region 20 is provided with a metal trace structure. However, due to the provision of the metal trace structure within only a part of the sealant coating region 20, the sealant is prone to result in non-uniformity during its coating. In addition, a metal can reflect UV (ultraviolet) light and the curing of the sealant is usually carried out by UV light irradiation, which will cause UV light irradiation powers on different regions of the sealant to be different. That is to say, the irradiation power of the UV light irradiated to the sealant region with the metal trace structure is different from the irradiation power of the UV light to the sealant region without the metal trace structure, which will cause poor curing of the sealant.

In view of the above problems, this embodiment provides an array substrate on which a metal structure is provided in a part of the sealant coating region where no metal trace structure is provided, and a difference between an area of the metal structure and that of the metal trace structure is smaller than a threshold. In this way, it is possible to solve the technical problems such as the uneven coating and the poor curing of the sealant due to the provision of the metal trace structure in only a part of the sealant coating region.

Figure 2:
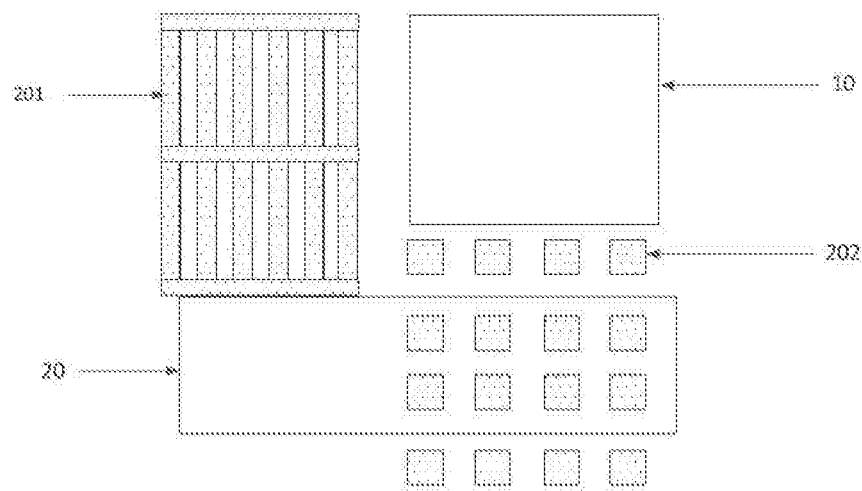
FIG. 2 is a first schematic diagram showing a part of a structure of an array substrate according to some embodiments of the present disclosure.
Figure 3:
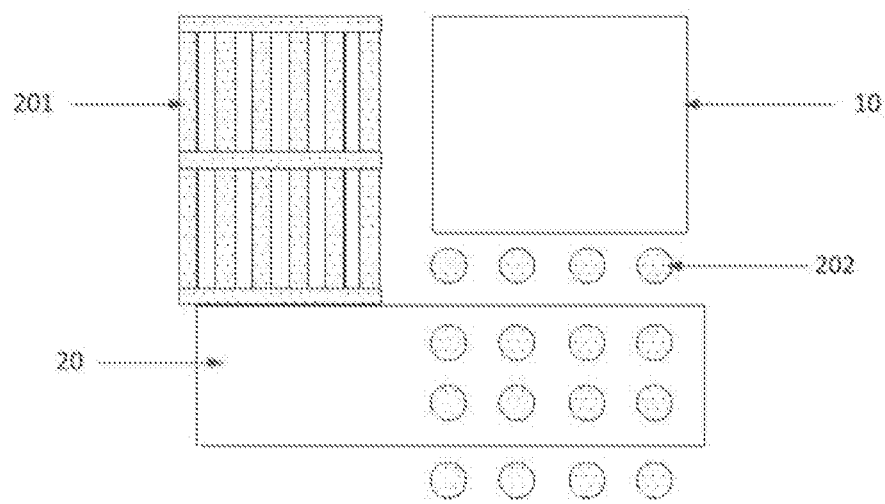
FIG. 3 is a second schematic diagram showing a part of a structure of an array substrate according to another embodiment of the present disclosure.
Figure 4:
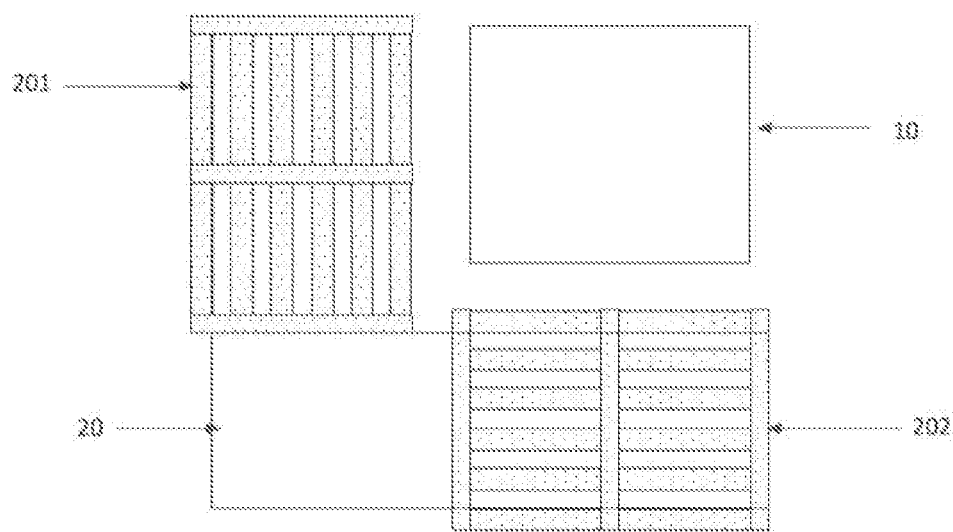

Specifically as shown in FIGS. 2 to 4, this embodiment provides an array substrate including a substrate body 10. A sealant coating region 20 to be coated with a sealant is provided on a perimeter edge of the substrate body 10. The sealant coating region 20 includes a first region provided with a metal trace structure 201. Furthermore, the sealant coating region further includes a region provided with a metal structure 202, and a difference between an area of the metal structure 202 and that of the metal trace structure 201 is smaller than a threshold.

The provision of the metal structure makes the sealant evenly fill space between the array substrate and a color filter substrate. The metal will reflect the UV light for curing the sealant, but the metal structure is provided to ensure that all regions of the sealant have a uniform metal reflectivity, so that the UV light irradiation powers can be substantially the same in all the regions of the sealant.

It should be noted that both the metal trace structure and the metal structure belong to dummy structures, that is, the metal trace structure and the metal structure are only the dummy structures arranged in the sealant coating region of the substrate body and having no electrical connection relationship with any signal line provided on the array substrate, and the metal structure is not connected to any external signals.

A specific area of the metal structure can be set according to actual needs, and the threshold can also be set according to actual needs. For example, in a specific implementation of this embodiment, the threshold can be zero, that is, the area of the metal structure is exactly the same as that of the metal trace structure. In another specific embodiment, the threshold can be 1 $\mu m^2$, but it is not limited thereto.

In this embodiment, the metal structure has a plurality of metal bumps disposed at intervals.

It should be noted that the metal structure may have various specific structural forms and also various specific shapes, which may be regular or irregular geometric shapes. Several implementations of the metal structure in this embodiment will be described below. For example, squares, circles and other designs for the metal structure arranged at intervals are shown in FIGS. 2 to 4.

In a specific implementation of this embodiment, as shown in FIG. 2, the metal bump is in the form of a square having a side of 2 to 10 micrometers, and the interval between two adjacent squares ranges from 2 to 10 micrometers.

It should be noted that the size of each of the square metal bumps and the interval between two adjacent square metal bumps can be set according to actual needs, and are not limited to those mentioned above.

In a specific implementation of this embodiment, as shown in FIG. 3, the metal bump is in the form of a circle having a diameter of 2 to 10 micrometers, and the interval between two adjacent circles ranges from 2 to 10 micrometers.

It should be noted that the size of the diameter of each circular metal bump and the interval between two adjacent circular metal bumps can be set according to actual needs, and are not limited to those mentioned above.

In a specific implementation of this embodiment as shown in FIG. 4, the metal trace structure includes a plurality of metal traces arranged at intervals, and an arrangement of the metal structure is the same as that of the metal trace structure.

In this embodiment, as shown in FIG. 1, the substrate body is further provided with a display region 10 enclosed within the sealant coating region 20, and the metal structure is located in a second region of the sealant coating region 20, and the first region is located on a first side of the display region 10 and the second region is on a second side of the display region, which is arranged adjacent to or opposite to the first side.

The specific positions of the first and second regions may be set according to actual needs. In a specific implementation of this embodiment, the sealant coating region 20 may include the first region and the second region.

In order to simplify steps of a manufacturing process, the metal structure and the metal trace structure are disposed in a same layer in this embodiment. Of course, those skilled in the art can understand that the metal structure and the metal trace structure may be disposed in different layers.

In this embodiment, a gate metal layer and a source-and-drain metal layer are on the substrate body, and the metal structure is disposed in a same layer as the gate metal layer, or the metal structure is disposed in a same layer as the source-and-drain metal layer.

Accordingly, by using the above embodiments of the present disclosure with the provision of the metal structure, the coating of the sealant can be made uniform, and when the sealant is cured by the UV light, the irradiation powers of the UV light are consistent in all the regions of the sealant so as to avoid the technical problems of the poor curing of the sealant.

It should be noted that a specific formation process of the metal structure can be set according to actual needs, and is not limited to those described above. A method for preparing the array substrate in a specific implementation of this embodiment will be described in detail below.

Figure 5:
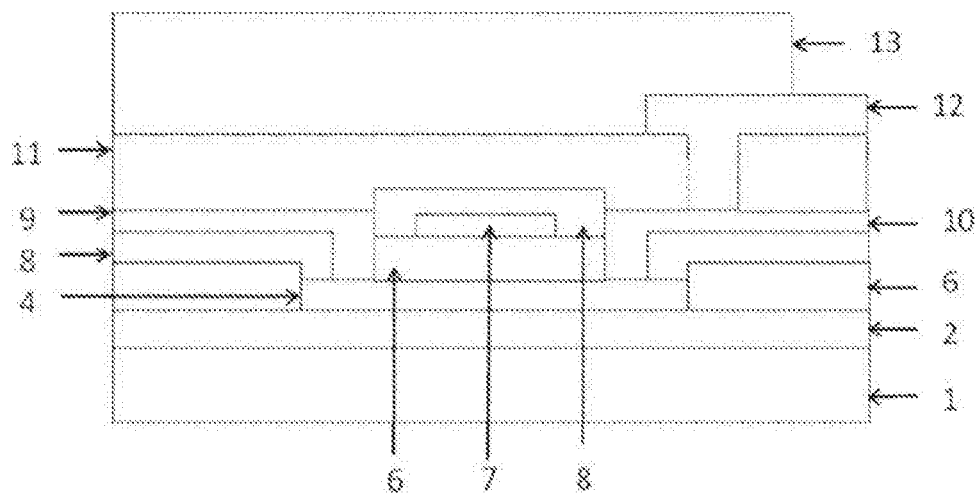
FIG. 5 is a schematic diagram showing a structure of an array substrate according to some embodiments of the present disclosure.

FIG. 5 is a schematic diagram showing a low temperature polysilicon field effect thin film transistor (TFT) array substrate. A field effect thin film transistor is formed in the display region as shown in FIGS. 1 to 4, and the display region further includes a plurality of data lines and a plurality of gate lines distributed in the form of an array. The data lines and the gate lines cross each other to define pixel regions, and each of the pixel regions is provided with a field effect thin film transistor. In a process for manufacturing the low temperature polysilicon field effect thin film transistor array substrate, eight (8) to nine (9) masking processes are typically needed. The process for manufacturing the low temperature polysilicon field effect thin film transistor array substrate shown in FIG. 5 will be described below with reference to FIGS. 6A to 6G.

Figure 6A:
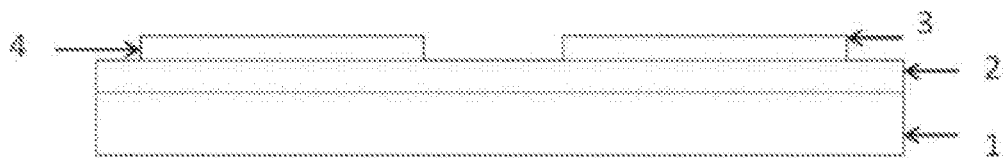
FIG. 6A is a first schematic diagram showing a part of the structure of the array substrate provided during its manufacturing process according to some embodiments of the present disclosure.

As shown in FIG. 6A, a silicon nitride (SiN) film and a silicon dioxide ($SiO_2$) film are sequentially deposited on an entire insulating substrate 1 by plasma enhanced chemical vapor deposition (PECVD) so as to form a buffet layer 2 made of silicon nitride and silicon dioxide. Next, an amorphous silicon (a-Si) film is formed on the buffer layer 2 by using PECVD or other chemical or physical vapor deposition processes. By means of excimer laser annealing (ELA) or solid phase crystallization (SPC), the a-Si film is crystallized into a polysilicon film. Then, a pattern in a photoresist layer is formed on the polysilicon film by using a conventional masking process. With the photoresist layer bring used as an etching barrier layer, a portion of the polysilicon film that is not protected by the photoresist layer is etched by using plasma to form a polysilicon active layer 4 and a polysilicon storage capacitor 3 (a part of the plasma-etched polysilicon film is used as the active layer of the TFT, the other part thereof is used as a bottom electrode of the storage capacitor, and a top electrode of the storage capacitor is formed of a gate metal). A transistor channel in the polysilicon active layer 4 is doped with ions at a low concentration by using an ion implantation process, so as to form a conductive channel in the polysilicon active layer 4, which is required by the field effect thin film transistor.

Figure 6B:
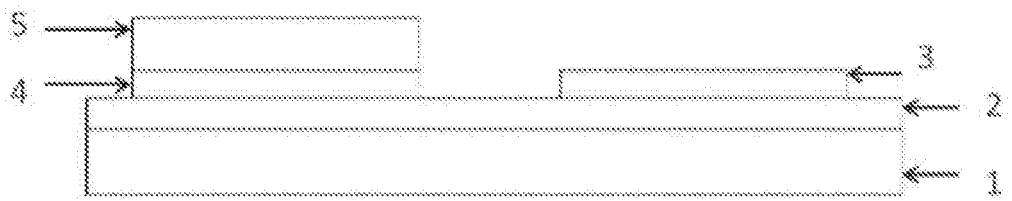
FIG. 6B is a second schematic diagram showing a part of the structure of the array substrate provided during its manufacturing process according to some embodiments of the present disclosure.

As shown in FIG. 6B, a photoresist layer 5 made of a photo-resistive material is formed on the polysilicon active layer 4 through a masking process so as to protect the polysilicon active layer 4 from ion implantation. The polysilicon storage capacitor 3 that is not protected by the photoresist layer is subjected to a high-concentration ion implantation process to convert the polysilicon storage capacitor 3 into a low-resistance doped polysilicon film. During subsequent processes shown in FIGS. 6C to 6G, since a second electrode plate of the capacitor composed of a gate insulating layer and a gate metal film is formed only on the polysilicon storage capacitor 3, the only subsequent photolithographic process for the polysilicon storage capacitor 3, i.e., the photolithographic process for forming the second electrode plate of the capacitor, is no longer shown in FIGS. 6C to 6G.

Figure 6C:
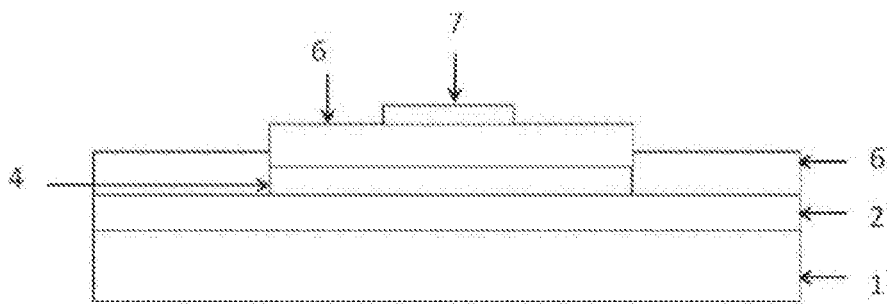
FIG. 6C is a third schematic diagram showing a part of the structure of the array substrate provided during its manufacturing process according to some embodiments of the present disclosure.

As shown in FIGS. 6B and 6C, the photoresist layer 5 on the polysilicon active layer 4 is removed by a photoresist peeling process, and a $SiO_2$ film or a composite film of $SiO_2$ and SiN is deposited by PECVD to form a gate insulating layer 6 on the polysilicon storage capacitor 3, the polysilicon active layer 4 and the entire buffer layer 2. One or more low-resistance metal material films are deposited on the gate insulating layer 6 by a physical vapor deposition process such as magnetron sputtering, and a gate electrode 7 is formed by a photolithographic process. The gate metal film may be a single-layer metal film such as Al, Cu, Mo, Ti or AlNd, or may be a multi-layer metal film such as Mo/Al/Mo or Ti/Al/Ti. With the gate electrode 7 being used as an ion implantation barrier layer, the polysilicon active layer 4 is doped with ions such that a low-impedance contact region of a source electrode and a drain electrode is formed in a region of the polysilicon active layer that is not blocked by the gate electrode.

Figure 6D:
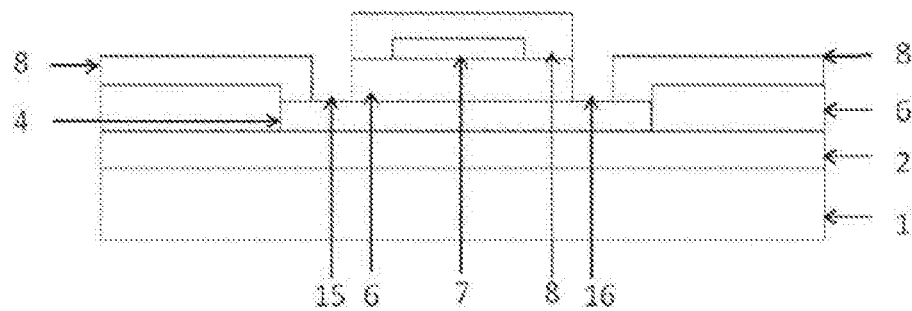
FIG. 6D is a fourth schematic diagram showing a part of the structure of the array substrate provided during its manufacturing process according to some embodiments of the present disclosure.
Figure 6E:
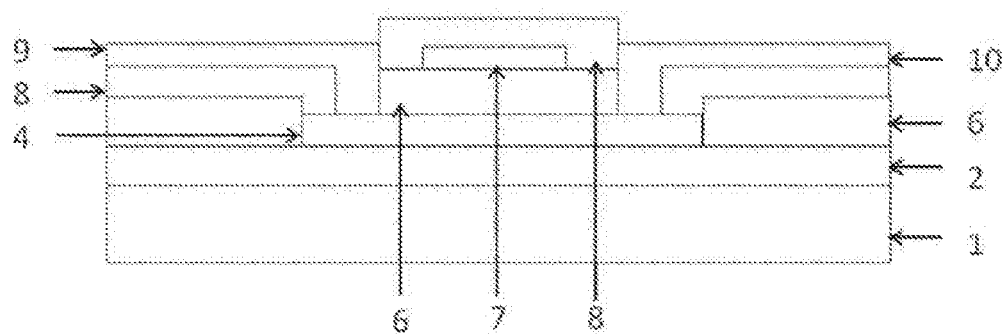
FIG. 6E is a fifth schematic diagram showing a part of the structure of the array substrate provided during its manufacturing process according to some embodiments of the present disclosure.

As shown in FIG. 6D, on the entire surface including the gate electrode 7, a $SiO_2$ film and a SiN film are sequentially deposited by PECVD to form an interlayer insulating layer 8. The interlayer insulating layer 8 is etched through a masking and etching process to form a source electrode contact hole 15 and a drain electrode contact hole 16. As shown in FIG. 6E, one or more low-resistance metal films are deposited by magnetron sputtering on the interlayer insulating layer 8 and the source electrode contact hole 15 and the drain electrode contact hole 16, and a source electrode 9 and a drain electrode 10 are formed through masking and etching processes. In this way, the source electrode 9 and the drain electrode 10 comes in ohmic contact with the polysilicon active layer 4 through the source electrode contact hole 15 and the drain electrode contact hole 16, respectively. The doped ions in the polysilicon active layer 4 are activated by rapid thermal annealing or heat treatment furnace annealing such that an effective conductive channel is formed in the polysilicon active layer 4 under the gate electrode 7. The source and drain metal film may be a single-layer metal film such as Al, Cu, Mo, Ti or AlNd, or may be a multilayer metal film such as Mo/Al/Mo or Ti/Al/Ti.

Figure 6F:
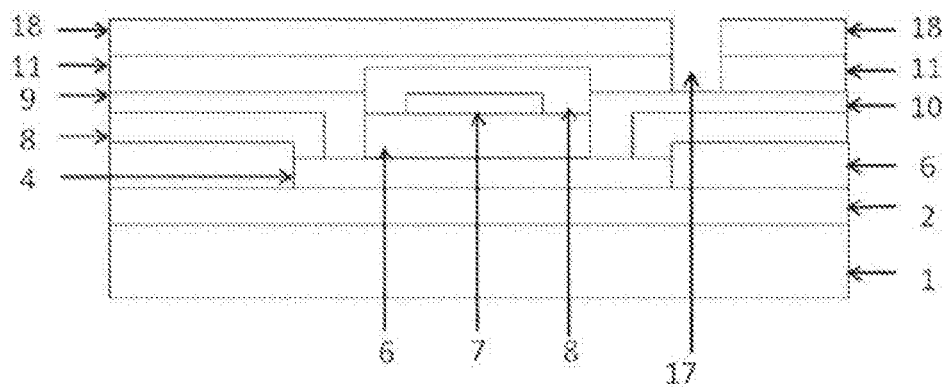
FIG. 6F is a sixth schematic diagram showing a part of the structure of the array substrate provided during its manufacturing process according to some embodiments of the present disclosure.

As shown in FIG. 6F, a layer of a SiN film is deposited on the entire surface including the source electrode 9 and the drain electrode 10 by PECVD, and a passivation layer 11 including a via hole 17 is formed by a masking and etching process. By means of a hydrogenation process by rapid thermal annealing or heat treatment furnace annealing, defects in the interior and interface of the polysilicon active layer 4 are repaired. Through another masking process, an organic planarization layer 18 having a same via hole as the via hole 17 is formed above the SiN passivation layer 11 to fill recesses on the surface of a device so as to form a flat surface.

Figure 6G:
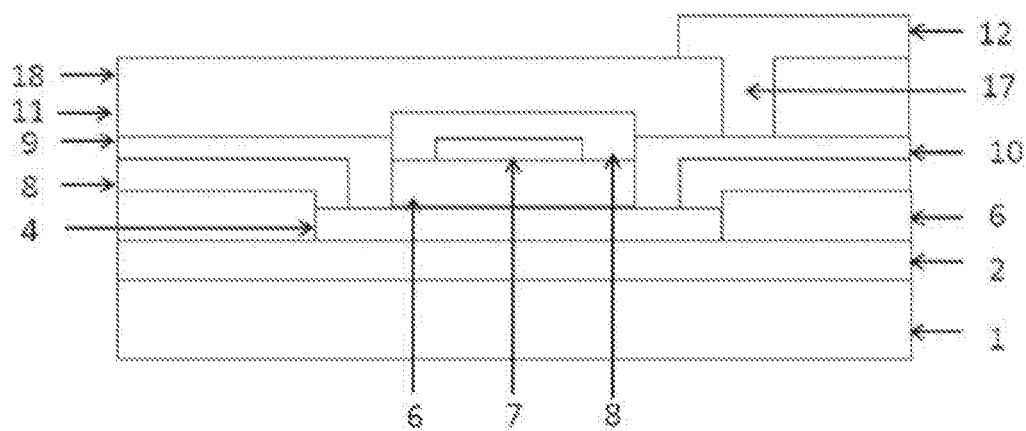
FIG. 6G a seventh schematic diagram showing a part of the structure of the array substrate provided during its manufacturing process according to some embodiments of the present disclosure.

As shown in FIG. 6G, a layer of a transparent conductive film is deposited above the organic planarization layer 18 and the via hole 17 by magnetron sputtering, and then etched by a photolithographic process so as to form a pixel electrode 12 in a pixel region above the via hole 17 and a part of the organic planarization layer 18. Then, a layer of a photosensitive organic material similar to the organic planarization layer 18 is coated on the organic planarization layer 18 and the pixel electrode 12, and then subjected to a final masking process to expose a partial region of the pixel electrode 12 so as to form a pixel-defining layer 13 as shown in FIG. 5. The pixel-defining layer 13 covets the organic planarization layer 18 and the partial region of the pixel electrode 12. The transparent conductive film may be a single-layer oxide conductive film, such as ITO (indium tin oxide) or IZO (indium zinc oxide), or it may be a composite film such as ITO (indium tin oxide)/Ag/ITO or IZO (indium zinc oxide)/Ag.

As discussed above, at least eight (8) to nine (9) photolithographic processes are required to form the low temperature polysilicon field effect thin film transistor array substrate as shown in FIG. 5, including the polysilicon active layer, the doped storage capacitor, the gate electrode, the interlayer insulating layer contact hole, the source and drain electrodes, the passivation layer via hole, the planarization layer, and the pixel electrode formed through the photolithographic processes.

The present disclosure further provides a display device including the array substrate as described above.

The display device may be any product or component having a display function, such as a liquid crystal television, a liquid crystal display (LCD), a digital photo frame, a mobile phone, and a tablet computer. The display device further includes a flexible circuit board, a printed circuit board (PCB), and a backplane.

The above are some optional embodiments of the present disclosure. It should be noted that several improvements and modifications can be made by those of ordinary skill in the art, without departing from the principles described in the present disclosure. These Improvements and modifications should also be considered as falling within the scope of this disclosure.

What is claimed is:

1. An array substrate, comprising:
   a substrate body; and
   a sealant coating region, which is on a perimeter edge of the substrate body, in which a sealant is coated, and which comprises a first region provided with a metal trace structure, wherein the sealant coating region further comprises a second region provided with a metal structure, and a difference between an area of the metal structure and that of the metal trace structure is smaller than a threshold,
   wherein the substrate body is further provided with a display region enclosed by the sealant coating region, the metal structure is arranged in the second region of the sealant coating region, and the first region is arranged on a first side of the display region and the second region is arranged on a second side of the display region, and
   wherein the second side is arranged substantially perpendicular to the first side.

2. The array substrate according to claim 1, wherein the metal structure has a plurality of metal bumps disposed at intervals.

3. The array substrate according to claim 2, wherein the metal bump is in the form of a square having a side of 2 to 10 micrometers, and the interval between two adjacent squares ranges from 2 to 10 micrometers.

4. The array substrate according to claim 2, wherein the metal bump is in the form of a circle having a diameter of 2 to 10 micrometers, and the interval between two adjacent circles ranges from 2 to 10 micrometers.

5. The array substrate according to claim 1, wherein the metal trace structure comprises a plurality of metal traces arranged at intervals, and an arrangement of the metal structure is substantially the same as that of the metal trace structure.

6. The array substrate according to claim 1, wherein an area of the metal stucture is substantially the same as that of the metal trace structure.

7. The array substrate according to claim 1, wherein the metal structure is disposed in a same layer as the metal trace structure.

8. The array substrate according to claim 1, wherein a gate metal layer and a source-and-drain metal layer are on the substrate body, and the metal structure is disposed in a same layer as the gate metal layer, or the metal structure is disposed in a same layer as the source-and-drain metal layer.

9. The array substrate according to claim 1, wherein the metal structure is not connected to any external signals.

10. A display device, comprising an array substrate,
    the array substrate comprising:
    a substrate body; and
    a sealant coating region, which is on a perimeter edge of the substrate body, in which a sealant is coated, and which comprises a first region provided with a metal trace structure, wherein the sealant coating region further comprises a second region provided with a metal structure, and a difference between an area of the metal structure and that of the metal trace structure is smaller than a threshold,
    wherein the substrate body is further provided with a display region enclosed by the sealant coating region, the metal structure is arranged in the second region of the sealant coating region, and the first region is arranged on a first side of the display region and the second region is arranged on a second side of the display region, and wherein the second side is arranged substantially perpendicular to the first side.

11. The display device according to claim 10, wherein the metal structure has a plurality of metal bumps disposed at intervals.

12. The display device according to claim 11, wherein the metal bump is in the form of a square having a side of 2 to 10 micrometers, and the interval between two adjacent squares ranges from 2 to 10 micrometers.

13. The display device according to claim 11, wherein the metal bump is in the form of a circle having a diameter of 2 to 10 micrometers, and the interval between two adjacent circles ranges from 2 to 10 micrometers.

14. The display device according to claim 10, wherein the metal trace structure comprises a plurality of metal traces arranged at intervals, and an arrangement of the metal structure is substantially the same as that of the metal trace structure.

15. The display device according to claim 10, wherein an area of the metal stucture is substantially the same as that of the metal trace structure.

16. The display device according to claim 10, wherein the metal structure is disposed in a same layer as the metal trace structure.

17. The display device according to claim 10, wherein a gate metal layer and a source-and-drain metal layer are on the substrate body, and the metal structure is disposed in a same layer as the gate metal layer, or the metal structure is disposed in a same layer as the source-and-drain metal layer.

18. The display device according to claim 10, wherein the metal structure is not connected to any external signals.

19. An array substrate, comprising:
a substrate body; and
a sealant coating region, which is on a perimeter edge of the substrate body, in which a sealant is coated, and which comprises a first region provided with a metal trace structure, wherein the sealant coating region further comprises a second region provided with a metal structure, and a difference between an area of the metal structure and that of the metal trace structure is smaller than a threshold,
wherein the substrate body is further provided with a display region enclosed by the sealant coating region, the metal structure is arranged in the second region of the sealant coating region, and the first region is arranged on a first side of the display region and the second region is arranged on a second side of the display region, and
wherein the second side is arranged substantially parallel to the first side but not in a same line.

20. A display device, comprising the array substrate according to claim 19.

* * * * *